Oct. 14, 1952 C. H. OLSON 2,613,984
FRUIT HOLDER
Filed July 8, 1949
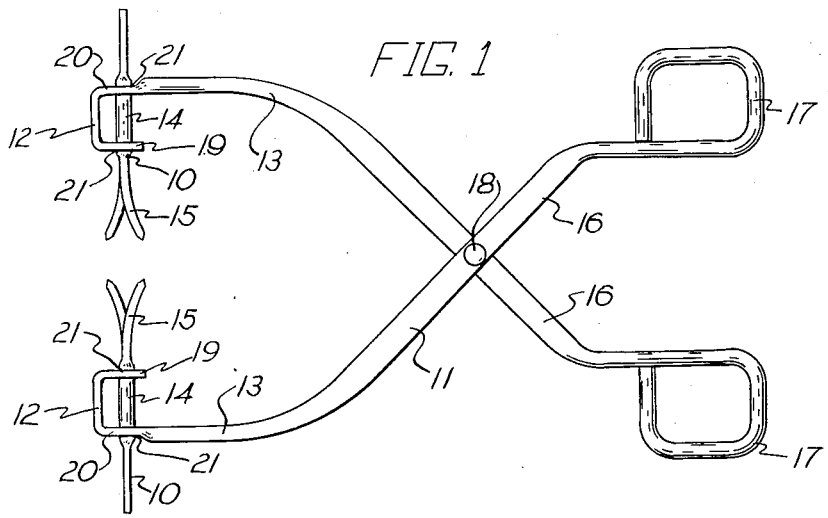
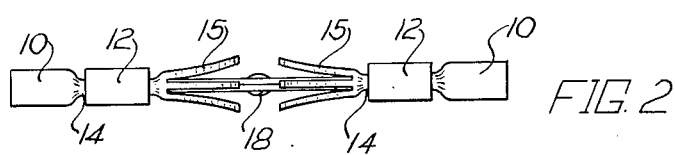
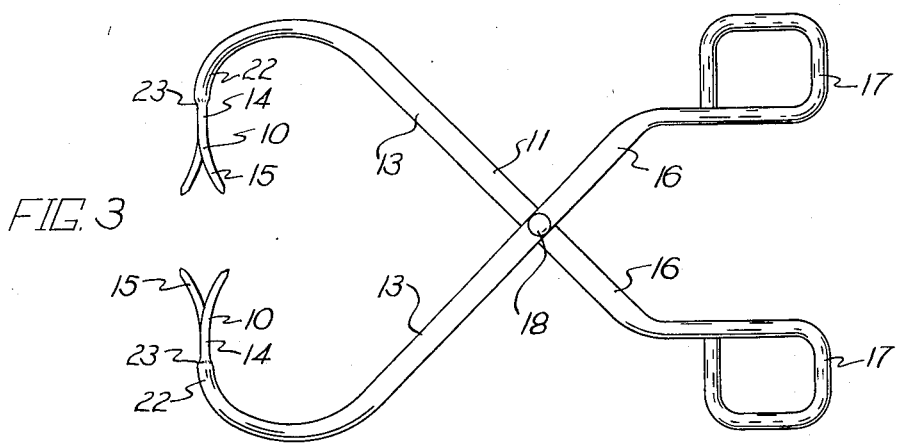
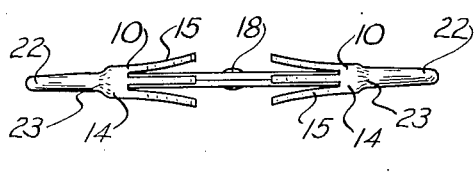
INVENTOR.
CLIFFORD H. OLSON
BY
G. H. Braddock
ATTORNEY Patented Oct. 14, 1952

2,613,984

UNITED STATES PATENT OFFICE 2,613,984

FRUIT HOLDER

Clifford H. Olson, Fargo, N. Dak.

Application July 8, 1949, Serial No. 103,701

1 Claim. (Cl. 294—118)

This invention has relation to a fruit holder.

An object of the invention is to provide a fruit holder which will be of new and improved construction.

A further object is to provide a fruit holder adapted to be especially useful for the purpose of retaining a peach while being pared or sliced and wherein will be incorporated novel and improved features and characteristics.

And a further object is to provide a fruit holder of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claim which follows.

In the accompanying drawing forming a part of this specification,

Fig. 1 is a plan view of a fruit holder made according to the invention;

Fig. 2 is an end elevational view of the fruit holder as it would appear from the left in Fig. 1;

Fig. 3 is a plan view of a fruit holder of modified construction including features and characteristics of the invention; and Fig. 4 is an end elevational view of the fruit holder disclosed in Fig. 3 as it would appear from the left in said Fig. 3.

Speaking generally, the fruit holder which the invention presents consists of oppositely disposed, complementary penetrating and gripping elements 10, 10 and supporting and manipulating means for said penetrating and gripping elements. As disclosed, the supporting and manipulating means is constituted as tongs 11 having interior portions, denoted 12 in Fig. 1, and 22 in Fig. 3, of its interior legs 13 separately and independently secured to said oppositely disposed, complementary penetrating and gripping elements.

Each complementary penetrating and gripping element 10 is constituted as a shank 14 and inwardly extending tines 15, three as shown, at 120 degrees apart, upon said shank. The complementary penetrating and gripping elements can be of duplicate construction, and said complementary penetrating and gripping elements are in the plane of the tongs 11 in the illustrated embodiments of the invention.

Exterior legs 16 of the tongs 11 support handles 17 upon their free end portions, and a pivot pin 18, situated between the interior and exterior legs 13 and 16, connects the units of said tongs to each other. The interior legs 13 include lengths thereof in adjacent relation to the pivot pin 18 substantially in the plane of the exterior legs 16, and the interior portions 12 of said interior legs, in remote relation to said pivot pin and in the plane of said tongs, extend inwardly substantially in perpendicular relation to the lengths of the interior legs which are in the plane of said exterior legs.

As disclosed in Figs. 1 and 2 of the drawing, the inner ends of the interior portions 12 of the interior legs 13 integrally or rigidly support exteriorly extending bearing members 19 disposed in spaced, parallel relation to bearing members 20 constituted as interior end portions of the lengths of said interior legs adjacent the pivot pin 18, and said bearing members 19 are in the plane of the tongs 11.

The bearing members 19 and 20 of each unit of the tongs provide bearings 21 which are in alinement in direction transversely of said tongs, said bearings all lie in a single plane, and the construction and arrangement are such that the bearings 21 provided by the different units of the tongs can be brought into alinement in response to swinging of the exterior and interior legs of said tongs toward each other.

As disclosed in Figs. 1 and 2, the shanks 14 of the penetrating and gripping elements 10 are rotatably supported, against the possibility of longitudinal movement, in the bearings 21 with the tines 15 situated at the inner sides of the bearing members 19.

As disclosed in Figs. 3 and 4, the inner ends of interior portions 22 of the interior legs 13, extending inwardly substantially in perpendicular relation to the lengths of said interior legs adjacent the pivot pin 18 and disposed in the plane of the tongs, are integrally or rigidly secured, as at 23, to the outer ends of the shanks 14 of the penetrating and gripping elements 10 in such manner that said penetrating and gripping elements lie in a single plane and can be brought into alinement in direction transversely of said tongs in response to swinging of the exterior and interior legs of said tongs toward each other.

In practical use of the fruit holder, the handles 17 will be spread apart to cause the tines 15 of the different penetrating and gripping elements to be spread apart, a fruit, such as, for example, a peach, will be positioned between the tines of said different penetrating and gripping elements, and the tongs will be actuated to cause said tines to enter oppositely disposed surfaces of the fruit. During the forcing of the tines into the fruit, the handles of the tongs will be grasped by the fingers of one hand while the fruit is retained in the other hand, and, when the fruit is a peach, said tines will be caused to engage opposite ends of the pit so that the tines, at 120 degrees apart, of each of the penetrating and gripping elements will grip said pit at three different locations, with end portions of the pit situated between free end portions of the tines. The fruit may be pared, or otherwise sliced or cut, while gripped in the holder, and ready and easy release of the fruit can be accomplished by movement apart of the handles of the tongs.

In the instance of the disclosure of Figs. 3 and 4, the fruit when gripped will bear fixed relation to the tongs. As disclosed in Figs. 1 and 2, the holder will grip the fruit in such manner as to permit its rotation, together with the penetrating and gripping elements as a unit, relative to the tongs.

What is claimed is:

In a fruit holder, the combination with a tongs having a pair of legs pivotally connected to each other for movement in a plane, of a pair of gripping elements each constituted as a cylindrical shank, a set of circumferentially spaced tines larger than and disposed inwardly of said shank and a flat enlarged outer end portion disposed outwardly of said shank, a pair of U-shaped members constituted as interior portions of said tongs integrally connected to opposite legs thereof and extending inwardly therefrom, a pair of bearing members each constituted as a part of opposite parallel portions of each of said U-shaped members, said shanks being mounted in said bearing members to be freely rotatable therein and to have said tines in facing relation to each other.

CLIFFORD H. OLSON.

REFERENCES CITED

The following references are of record in the file of this patent:

UNITED STATES PATENTS

| Number | Name | Date |
|---|---|---|
| 166,599 | Frederick | Aug. 10, 1875 |
| 221,152 | Burgess | Nov. 4, 1879 |
| 395,698 | Fetherstonhaugh | Jan. 8, 1889 |
| 565,369 | Son | Aug. 4, 1896 |